United States Patent
Stone et al.

(10) Patent No.: US 7,236,853 B2
(45) Date of Patent: Jun. 26, 2007

(54) AUTOMATED ROBOT ALIGNMENT SYSTEM AND METHOD USING KINEMATIC PINS AND END EFFECTOR SENSOR

(75) Inventors: Stanley W. Stone, Gloucester, MA (US); Kevin M. Daniels, Wakefiled, MA (US)

(73) Assignee: Varian Semiconductor Equipment Associates, Inc., Gloucester, MA (US)

( * ) Notice: Subject to any disclaimer, the term of this patent is extended or adjusted under 35 U.S.C. 154(b) by 169 days.

(21) Appl. No.: 10/956,309

(22) Filed: Oct. 1, 2004

(65) Prior Publication Data
US 2005/0240290 A1    Oct. 27, 2005

Related U.S. Application Data

(60) Provisional application No. 60/507,898, filed on Oct. 1, 2003.

(51) Int. Cl.
*G06F 19/00* (2006.01)
*B25J 9/18* (2006.01)

(52) U.S. Cl. ............... 700/245; 700/186; 700/193; 700/194; 318/568.11

(58) Field of Classification Search ............ 700/64, 700/69, 70, 186, 193, 194, 251, 252, 262, 700/245; 318/568.11, 568.12, 569.19
See application file for complete search history.

(56) References Cited

U.S. PATENT DOCUMENTS

| | | | |
|---|---|---|---|
| 4,665,352 A * | 5/1987 | Bartelt et al. | 318/568.15 |
| 4,705,451 A * | 11/1987 | Mori et al. | 700/251 |
| 5,758,298 A * | 5/1998 | Guldner | 701/23 |
| 6,340,895 B1 * | 1/2002 | Uher et al. | 324/755 |
| 6,413,113 B2 * | 7/2002 | Uher et al. | 439/372 |
| 6,556,032 B2 * | 4/2003 | Uher et al. | 324/755 |
| 6,580,283 B1 * | 6/2003 | Carbone et al. | 324/760 |
| 6,615,112 B1 * | 9/2003 | Roos | 700/254 |
| 6,789,328 B2 * | 9/2004 | Beckhart et al. | 33/645 |
| 6,830,651 B2 * | 12/2004 | Obikane | 156/345.31 |
| 7,066,707 B1 * | 6/2006 | Bonora et al. | 414/744.3 |

* cited by examiner

*Primary Examiner*—Thomas K. Pham

(57) ABSTRACT

A method and system can align a robot arm with a payload station. A probe and a contact detector may be positioned on the robot arm and three pins may be placed on the payload station. A controller may move the robot arm in a pattern over the payload station until contact may be made between the probe and one of the pins. A search about the contact location may be performed to obtain additional contacts. The search may be interrupted when contact is made between the probe and one of the pins. The position of the pin may be calculated from three such contacts on the spherical portion of the pin. The location of the probe at the time of contact may be stored and a localized search about the pin location may be performed. If the position of the pin cannot be resolved from three contacts, additional contacts may be made until a combination of three contacts does provide a solution. Three such pins may be so located such that the robot arm may learn the position of the payload station without operator intervention.

17 Claims, 5 Drawing Sheets

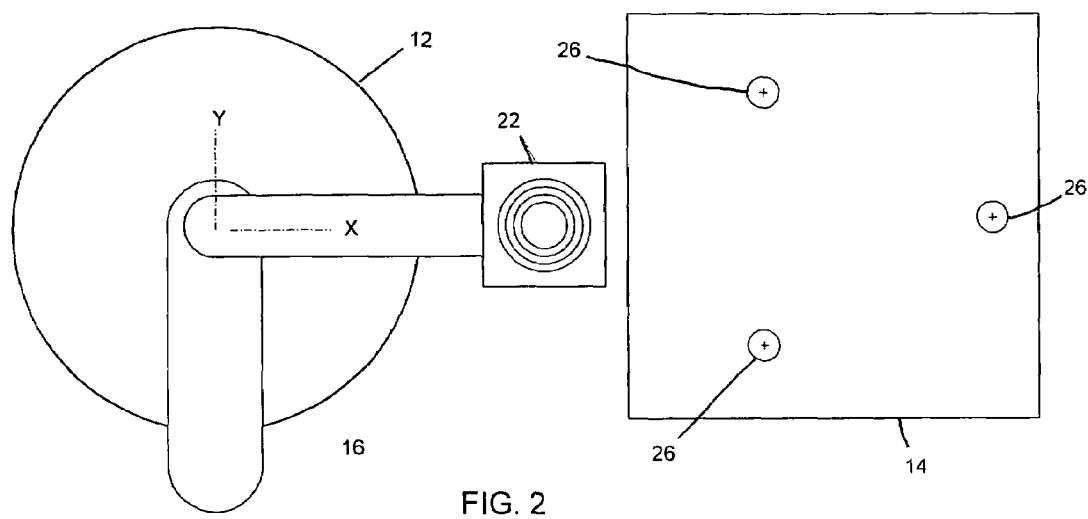
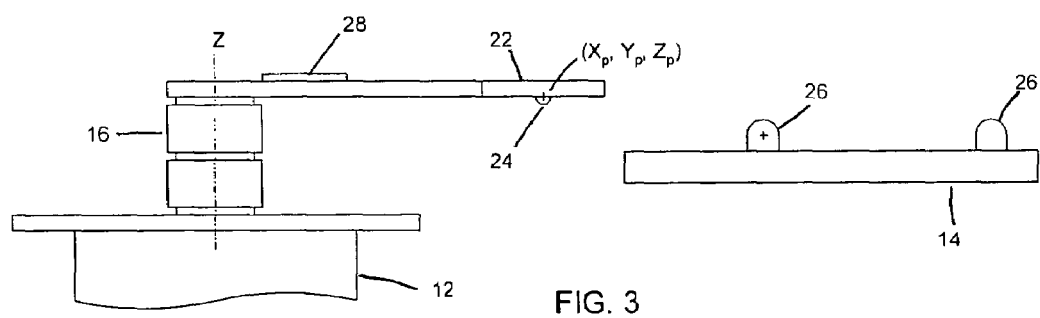

AUTOMATED ROBOT ALIGNMENT SYSTEM AND METHOD USING KINEMATIC PINS AND END EFFECTOR SENSOR

RELATED APPLICATIONS

This application is co-pending with related patent application entitled "Wafer Handler Method and System" by the same inventor and having assignee in common, filed concurrently herewith, and incorporated by reference herein in its entirety. This application also claims priority under 35 U.S.C. § 119(e) to U.S. Provisional Patent Application Ser. No. 60/507,898, filed Oct. 1, 2003, entitled "Automated Robot Alignment System and Method Using End Effector Sensor," the disclosure of which is hereby incorporated by reference.

FIELD

The systems and methods relate to alignment of handler robots, and more particularly to automated alignment using a robot mounted sensor.

BACKGROUND

Handler robots may be used to transfer payloads between stations, e.g., vacuum robots may be used in semiconductor manufacturing to transfer a wafer between load locks and the wafer orienter. Fixtures may be used at the stations to center the end effector, or payload pick over the stations, so as to teach the robots the station positions. In order to minimize misplacement of the payload at its destination station, the taught positions may be at the center of the locations of the stations, or may be displaced in the same direction and magnitude relative to the station locations.

Generally, the robots may be taught by means of an operator manually placing the end effector over the target fixture at the stations and recording the position. Thus, the quality of the alignment may be a function of the operator's skill in placing the end effector over the target. Alignment errors due to human variability may result in misplacement of the payloads that may cause damage to the payloads and/or the handling equipment.

SUMMARY

According to the methods and systems described herein, a method for aligning a movable arm with a target may comprise bringing a spherical portion of a probe on the movable arm in contact with a pin on the target, moving the probe to contact the pin at two additional probe positions, determining the pin location based on the location being a solution for the intersection of three spheres, each of the spheres being centered at a respective one of the probe positions when the probe contacted the pin and having a radius equal to the radius of the spherical portion of the probe plus the radius of the spherical portion of the pin, moving the probe to contact the pin at a further probe position and returning to determining the pin location when there is no solution and repeating the above process for additional pins on the target.

To bring the probe into contact with the pin, the method can comprise positioning the probe at a predetermined position with respect to an anticipated location of the target, moving the probe in a pattern in a plane parallel to the anticipated plane of the target and designed to cover the area corresponding to the target, moving the probe closer to the anticipated plane of the target when no contact has been made during moving the probe in the pattern and repeating moving the probe in the pattern and moving the probe closer until the contact is made.

To contact the pin at additional locations, the method can comprise moving the probe in a predetermined pattern about possible locations of the pin based on the probe position when contact with the pin was first made. The positions of the probe when contact is made can be stored and retrieved for use in determining the in location, and the pin locations can be stored and retrieved for use in determining the target location.

When there is no solution using previous probe positions, the method may determine the location by using the further probe position and combinations of two previous probe positions to determine a solution for the location of the pin. To contact the pin at additional or further locations, the method can comprise moving the probe in a predetermined pattern about possible locations of the pin based on the probe position when contact with the pin was first made. The positions of the probe when contact is made can be stored and retrieved for use in determining the pin location, and the pin locations can be stored and retrieved for use in determining the target location.

The movement of the movable arm may be controlled by manipulation of the arm by an operator, or may be controlled by programming a processing system. The processing system may be part of a system comprising a handler robot with the movable arm, a payload station wherein the target is mounted, a controller controlling movement of the movable arm and a contact detector to detect contacts between the probe and the pins. The processing system may also find use in storing the probe positions and determining the locations of the pins.

In one embodiment, a method for aligning a movable arm with a target may comprise bringing a probe on the movable arm in contact with a pin on the target at a first probe position, moving the probe to contact the pin at additional probe positions, determining a location of the pin based on the location being a solution of possible locations for the pin determined from the first and additional probe positions, moving the probe to contact the pin at further probe positions and returning to determining the location when the solution is not obtained and repeating the bringing, storing, moving and determining for additional pins on the target.

BRIEF DESCRIPTION OF THE DRAWINGS

The following figures depict certain illustrative embodiments of the systems and methods in which like reference numerals refer to like elements. These depicted embodiments are to be understood as illustrative and not as limiting in any way.

FIG. 2 shows a detailed schematic representation of a top view of a robot arm and a target fixture of the system of FIG. 1;

FIG. 3 shows a detailed schematic representation of a side view of the robot arm and target fixture of FIG. 2;

DETAILED DESCRIPTION OF THE PREFERRED EMBODIMENTS

Figure 1:
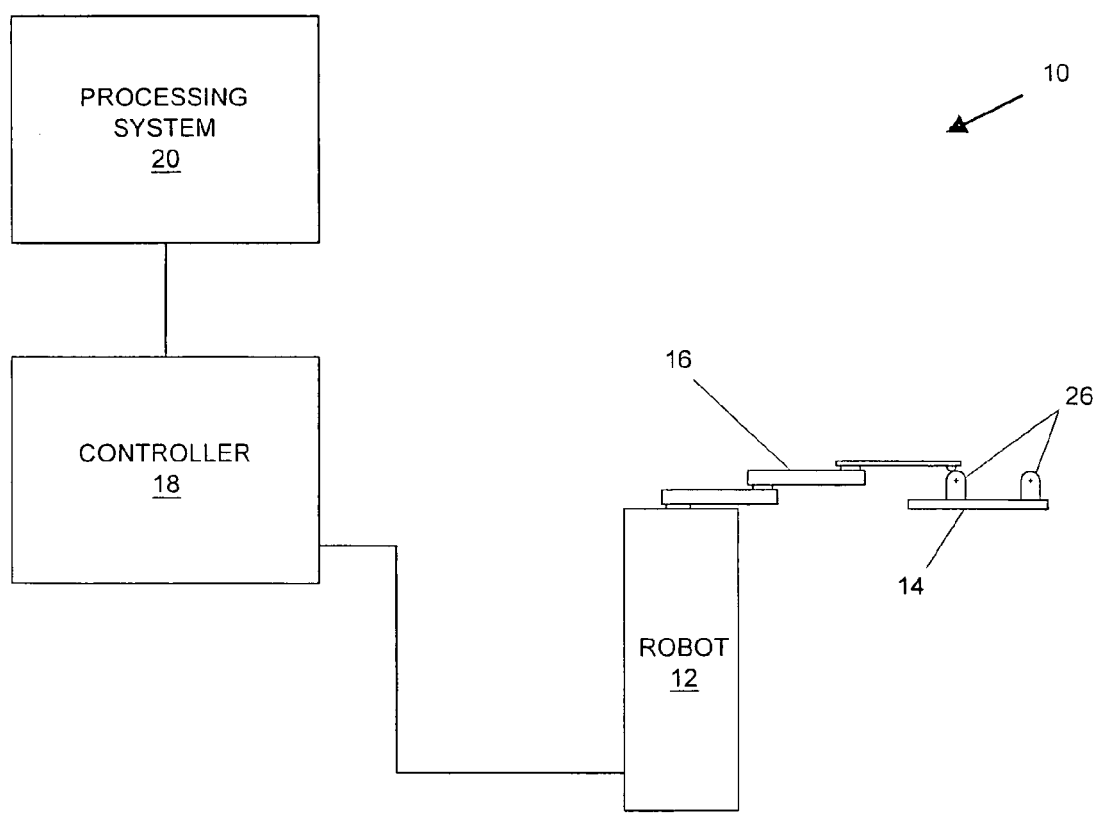
FIG. 1 shows a schematic representation of a system for aligning a handler robot with a payload station.

Referring to FIG. 1, there is shown a schematic representation of a system 10 for aligning a handler robot 12 with a payload station 14. Robot 12 may include an arm 16 that can be capable of movement in three directions, i.e., within and perpendicular to the plane of FIG. 1. System 10 may also include a controller 18 to control movement of robot arm 16. A processing system 20, such as a computer, may be connected to controller 18 to process data to/from controller 18.

Referring now also to FIGS. 2 and 3, respective top and side views of the robot arm 16 and payload station 14 may be shown. The three directions of movement may be illustrated by axes X, Y and Z. Robot arm 16 may include an end effector 22. It can be noted that other movements of end effector 22, e.g., rotation about the X axis, may be possible, but not necessary for the operation and implementation of the alignment system and method described herein.

During normal payload transfer operations, end effector 22 may include a mechanism for lifting and releasing the payload. For the alignment system and method described herein, a probe 24 may be affixed to end effector 22. Probe 24 may be a portion of end effector 22, or may be a separate component attached to end effector 22 when alignment may be performed. The probe 24 may be located at a known location on end effector 22, such that its center position $(X_p, Y_p, Z_p)$ may be determined by controller 18 based on the movement of robot arm 16 by controller 18. Payload station 14 may have pins 26 attached thereto, at known positions with respect to payload station 14. The pins 26 may be standardized or other conventional pins. For example, the pins 26 may be SEMI E57 Kinematic pins as are standard and known in the art for positioning payloads at payload station 14.

Figure 4:
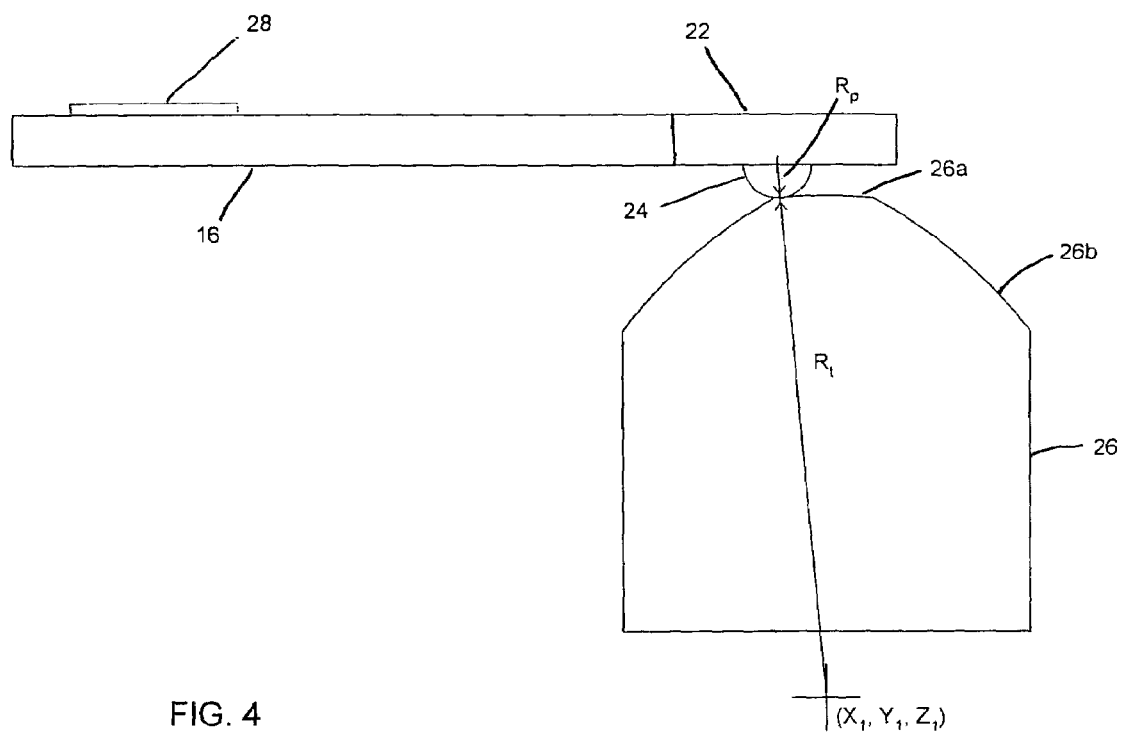
FIG. 4 shows a more detailed representation of an end effector and target of the system of FIG. 1.

Referring now also to FIG. 4, there may be shown a more detailed side view of probe 24 in contact with a tip 26a of one of the pins 26. In the embodiment shown, probe 24 and tip 26a may be spherical. Thus, the center position $(X_1, Y_1, Z_1)$ of tip 26a may be determined by noting that $(X_1, Y_1, Z_1)$ will lie on a sphere of radius $(R_p + R_t)$, centered at $(X_p, Y_p, Z_p)$, where $(X_p, Y_p, Z_p)$ can be determined by controller 18 based on the known location of probe 24 with respect to arm 16, $R_p$ can be the radius of probe 24 and $R_t$ can be the radius of tip 26a. Thus, $$(X_1-X_p)^2+(Y_1-Y_p)^2+(Z_1-Z_p)^2=(R_p+R_1)^2. \quad [1]$$

As may be known, if three such measurements are made at different positions about tip 26a, the intersection of the resulting three spheres may define the location $(X_1, Y_1, Z_1)$ of pin 26. If the locations of three or more pins 26 on payload station 14 can be so determined, then the location of payload station 14, with respect to controller 18, may be uniquely defined, both in location and angular orientation.

Figure 5:
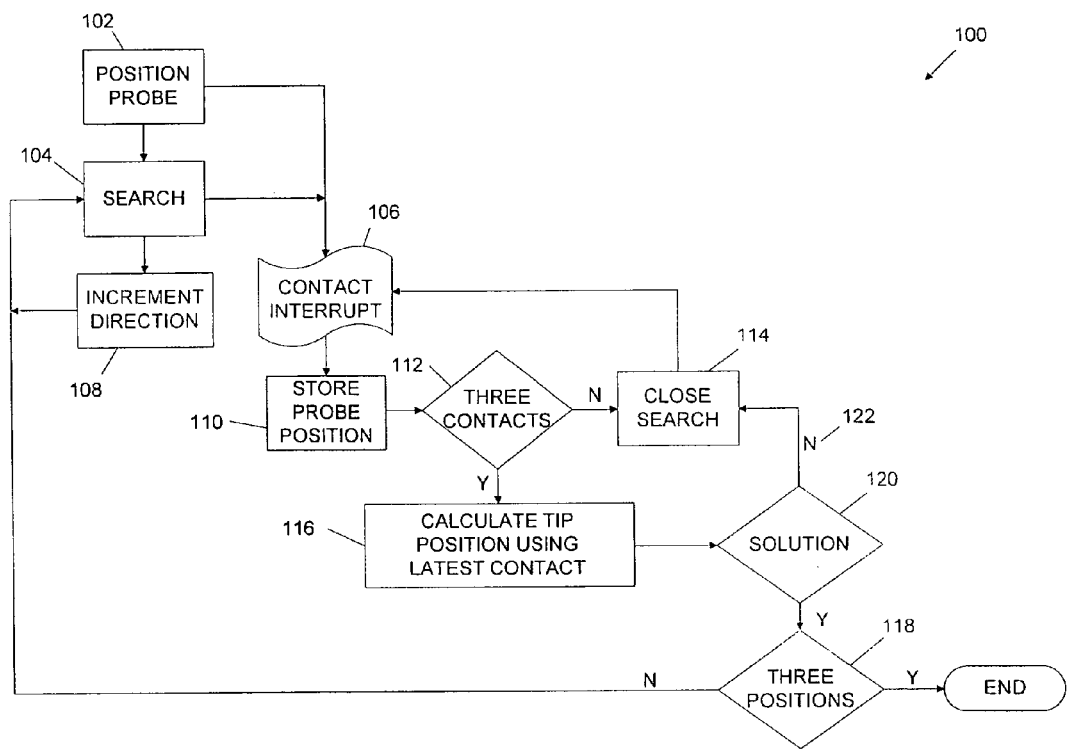
FIG. 5 shows a flow chart for a method for automated alignment of the robot arm.

Referring now to FIG. 5, there may be illustrated a flow chart for a method 100 of aligning the robot arm 16 with the payload station 14. Controller 18 may first position robot arm 16 such that probe 24 may be in the expected vicinity of payload station 14 (102). The expected position may be previously determined from the known geometry of payload station 14, robot arm 16 and other equipment measurements, as may be available. Controller 18 may then move the probe in a search pattern in the X-Y plane (104) until a contact is made, as denoted by contact interrupt 106.

For the embodiment shown, the search pattern may include incremental movements in the X and Y directions, such that over time, the probe may have traversed over the total area of payload station 14. Processing system 20 may track the movement of probe 24 to determine the area of payload station 14 covered by the search pattern. When processing system 20 determines that the total area of payload station may have been covered by probe 24, controller 18 may increment the probe in the Z direction, i.e., move probe 24 closer to payload station 14, as indicated at 108 and begin a new search. Other search patterns as may be allowed by the movement of robot arm 16 can be implemented, without limitation to the application of the method described herein. For example, searches may begin with a search in a X-Z plane, a Y-Z plane, or in an oblique plane, with increments in a direction normal to the chosen plane, or searches may be done in a three dimensional pattern, as may suit the geometry of the equipment.

Contact of the probe 24 and tip 26a can be determined by noting a resistance to additional movement of probe 24. In the embodiment shown in FIGS. 2–4, the resistance to movement may be indicated by the deflection of robot arm 16 when contact is made. One or more strain gauges, or other deflection measurement devices may be mounted on robot arm 16 to measure the deflection of robot arm 16 and function as a contact detection device 28. The resistance to movement may also be indicated by an increase in power needed to move probe 24. It can be understood that other means, as may be known to those in the art, to indicate contact between probe 24 and tip 26a can be used, e.g., electrical conductivity, and the above description may not be seen as limiting the choice of contact detection devices.

When contact is indicated, the position of probe 24 may be stored (110), e.g., at processing system 20. Method 100 may then determine if three positions of probe 24 in contact with tip 26a may have been stored (112). If less than three positions may have been stored, controller 18 may move probe 24 in a close search pattern (114) about the previous contact position until a total of three contacts on tip 26a may be stored. The close search may be similar to the search 104, in that the position of probe 24 may be incrementally changed until the contacts can be made. However, the close search may take advantage of known information, such as direction of travel of the probe 24 when the previous contact may have been made, radius of tip 26a, and other information that processing system 20 may use to limit the search to the general area and/or volume near the previous contact position.

When three contact positions may have been stored, processing system 20 may calculate (116) the position of pin 26 based on the intersection of three spheres of radius $(R_p+R_t)$, respectively centered at the three stored positions. Method 100 may return to perform a new search 104 until three such pin 26 positions may have been identified, as determined at 118. It can be noted that processing system 20 may modify the subsequent searches 104 so as to avoid previously calculated positions for pins 26, or so as not to repeat locations covered by a previous search. As indicated previously, the identification of the three pin 26 positions can uniquely define the location of payload station 14, with respect to controller 18.

The SEMI E57 Kinematic pins provide a desirable target for auto-teaching of wafer handling robots. The geometry of the ins are very well defined, uniform from system to system and represent the alignment surface used by a wafer carrier or FOUP for precise and repeatable mounting of the carrier. Three of these pins are used in a geometry as defined by the SEMI E57 standard. The FOUP contacts these pins at exactly six locations, uniquely defining the mating of the two parts (the FOUP and the load port). However, the SEMI E57 Kinematic pins may include a non-spherical base portion 26b. As shown in FIG. 4, tip 26a may not provide sufficient contact surface to ensure that the contacts made by search 104 or close search 114 will lie on tip 26a. Thus, the contacts may include one or more contacts on base portion 26b. In such cases, the three spheres may not intersect and the calculation at 116 may not provide a solution for the position of pin 26. To use the technique of robot self-teaching described in the above referred co-pending patent application, the alogorithm for determining the center of the pin must be modified. Due to the shape of the contact surface of the pin, a revolved circular arc, a more sophisticated algorithm than the previously described ones must be employed.

Figure 6:
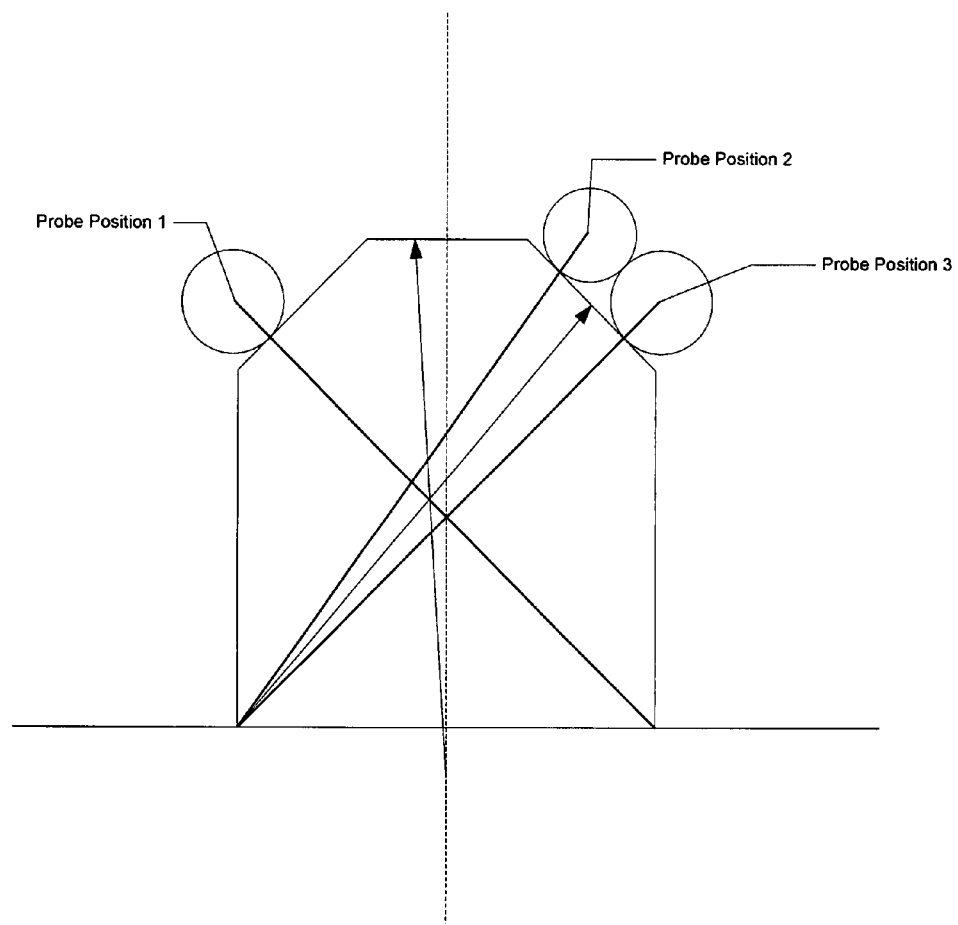
FIG. 6 shows a detailed representation of probe contacts away from spherical portions of SEMI E57 pins used in an embodiment of the present invention.

The method to determine the target location of the pill uses a similar technique of touching the contact surface with the probe sphere mounted on the backside of the wafer pick. When contact is made with the surface, the x, y and location is stored. As illustrated in FIG. 6, From these probe positions, three spheres can be generated, with a radius of $r_p+15$ mm. The radius of curvature of the SEMI E57 pin in the contact region is 15 mm. These three spheres are tangent to a horizontal circle with a radius of 6 mm (the radius of the SEMI E57 pin) whose center is the target position of the pin. So the solution is one which meets the following criteria. The target position defines a circle which is inside of the three spheres and therefore the target point is within the spheres. The circle is tangent to the spheres and the slope of the curve of the circle at the contact point is the same as a line formed by a plane that is tangent to the sphere at the point of contact and a horizontal plane that contains the target point and therefore the circle.

Given these constraints a set of simultaneous equations can be generated and solved to determine the target point. Three probe positions on the contact surface would generate sufficient information to uniquely solve for the target position. For instance, multiple probe positions of three or greater could be used with a least squares technique for determining the best fit for an over-sampled condition. Additionally, points acquired on the top surface of the pins are discriminated. The surface is spherical with a 15 mm radius located 2 mm below the horizontal datum plane. Points can be used from this surface, but a different algorithm must be used from the one described in the co-pending patent application to determine the target point. With over-sampling and using the known geometry of the pin, discrimination of the two surfaces can be achieved.

If calculation 116 does not provide a solution, as determined at 120, the process 100 may return to 114 to perform another close search. When another contact may be detected at 106, the probe position is again stored at 110. Since at least three contacts have been made, 112 returns to the calculation at 116. Calculation 116 may be performed for the latest contact position and combinations of two other contacts.

As an example, if three contacts $c_1$, $c_2$ and $c_3$ do not provide a solution, a fourth contact $c_4$ may be obtained and calculation 116 may be performed with the combinations $(c_1, c_2, c_4)$, $(c_1, c_3, c_4)$ and $(c_2, c_3, c_4)$. Likewise, if a fifth contact $c_5$ may be required, the combinations $(c_1, c_2, c_3)$, $(c_1, c_3, c_5)$, $(c_1, c_4, c_5)$, $(c_2, c_3, c_5)$, $(c_2, c_4, c_5)$ and $(c_3, c_4, c_5)$ may be used. Thus, it can be seen that an n-th contact may require calculations for $$\frac{(n-1)^2 - (n-1)}{2}$$

combinations. If one of the calculations at 116 returns a solution, as determined at 120, process 100 may then proceed to 118, where it can be determined if three such pin positions have been defined.

Thus, once probe 24 and contact detection device 28 may be positioned on robot arm 16 and pins 26 may be placed on payload station 14, the method 100 may be implemented. Processing system 20 may provide instructions to controller 18 to move robot arm 16 in a search pattern and to interrupt the search pattern when contact may be made between probe 24 and the spherical tip 26a of one of the pins 26. The location of probe 24 at time of contact may be stored in processing system 20. Processing system 20 may direct controller 18 to perform a localized search about the pin location. Processing system 20 may calculate a position of the pin 26 from three or more such contacts using the intersection of three spheres centered at the locations of probe 24 at the time of contact. The method 100 may proceed under the control of processing system 20 until the three pins 26 may be located. Thus, robot arm 16 may learn the position of payload station 14 without operator intervention.

However, it may be beneficial for some configurations of payload station 14 and robot arm 16 to have an operator move the robot arm 16 to perform one or both of search 104 and close search 114. Controller 18 and robot arm 16 may be in a "learning mode" and the operator may move probe 24 into contact with the tip 26a of one of the pins 26. When the operator brings probe 24 into contact with tip 26a, processing system 20 may store the probe position, as provided in the automated method 100.

It can be appreciated that the operator movement of probe 24 may result in erroneous contact indications from the contact detection device 28, i.e., in the case of strain gauges 28, operator manipulation of robot arm 16 may cause deflections of robot arm 16 that the contact device would interpret on contact. In such instances, the operator may disable the contact device 28 and the operator may provide the indication to processing system 20 to record the position of probe 24. By simple movements of the probe 24 about the tip 26a, the operator may store at least three contact locations for the probe 24 and processing system 20 may determine the position of tip 26a and repeating this process at the remaining pins can determine the position of payload station 14, as described previously.

As previously described in relation to process 100, operator movement and the operator contacts may also not provide a solution for the position of pin 26 due to the shape of the pins due to non-spherical portions such as is the case for SEMI E57 Kinematic pins for example. In such cases, an indication may be provided to the operator by 120 that no solution was found (as indicated by the symbol "N", labeled 122 in FIG. 5). The operator may perform the additional close search as at 114 to obtain an additional contact, or the close search may be performed automatically by controller 18.

While the methods and systems have been disclosed in connection with the preferred embodiments shown and described in detail, various modifications and improvements thereon will become readily apparent to those skilled in the art. As an example, probe 24 and tip 26a may have other than spherical surfaces. For embodiments where location along the z axis may not be critical, probe 24 and tip 26a may be cylindrical, such that contact may place the cylindrical axis of tip 26a on a circle of radius ($R_p+R_t$) centered at ($X_P$, $Y_P$, $Z_P$). However, vertical alignment of the probe 24 and pin 26 may affect the resolution obtainable for the position of pin 26. Those with ordinary skill in the art can recognize that the arrangement of the components shown in FIG. 1 and the items shown in FIG. 5 may be merely for illustrative purposes and can be varied to suit the particular implementation of interest. Accordingly, items may be combined, expanded, or otherwise reconfigured without departing from the scope of the disclosed methods. As an example, robot 12 may incorporate either, or both, the processing system 20 and the controller 18.

The methods and systems described herein may not be limited to particular hardware or software configuration, and may find applicability in many processing environments where robots may be used to position a payload at a station. The methods can be implemented in hardware or software, or a combination of hardware and software. The methods can be implemented in one or more computer programs executing on one or more programmable computers that include a processor, a storage medium readable by the processor, one or more input devices, and one or more output devices. In some embodiments, such as that of FIG. 1, a processing system may be used. In other embodiments, the methods may be implemented on a computer in a network. User control for the systems and methods may be provided through known user interfaces.

The computer program, or programs, may be preferably implemented using one or more high level procedural or object-oriented programming languages to communicate with a computer system; however, the programs can be implemented in assembly or machine language, if desired. The language can be compiled or interpreted.

The computer programs can be preferably stored on a storage medium or device (e.g., CD-ROM, hard disk, or magnetic disk) readable by a general or special purpose programmable computer for configuring and operating the computer when the storage medium or device may be read by the computer to perform the procedures described herein. The method and system can also be considered to be implemented as a computer-readable storage medium, configured with a computer program, where the storage medium so configured may cause a computer to operate in a specific and predefined manner.

The aforementioned changes may also be merely illustrative and not exhaustive, and other changes can be implemented. Accordingly, many additional changes in the details and arrangement of parts, herein described and illustrated, can be made by those skilled in the art. It will thus be understood that the following claims may not to be limited to the embodiments disclosed herein. The claims can include practices otherwise than specifically described and are to be interpreted as broadly as allowed under the law.

What is claimed is:

1. A method for aligning a movable arm with a target, comprising the steps of:
    bringing a spherical portion of a probe on the movable arm in contact with a pin on the target, the probe contacting the pin at a first probe position;
    moving the probe to contact the pin at two additional probe positions;
    determining a location of the pin based on the location being a solution for an intersection of three spheres, each of the spheres being centered at a respective one of the probe positions and having a radius equal to a radius of the spherical portion of the probe plus a radius of a spherical portion of the pin;
    moving the probe to contact the pin at a further probe position when there is no solution for the intersection of the three spheres and returning to determining the location; and
    repeating the steps of bringing, storing, moving and determining for at least two additional pins on the target when the solution is determined.

2. The method of claim 1, wherein the step of bringing comprises:
    positioning the probe at a predetermined position with respect to an anticipated location of the target;
    moving the probe in a pattern in a plane parallel to the anticipated plane of the target, the pattern covering an area corresponding to an anticipated target area;
    moving the probe closer to the anticipated plane of the target when no contact has been made during the step of moving the probe in the pattern; and
    repeating the steps of moving the probe in the pattern and moving the probe closer until the contact is made.

3. The method of claim 1, wherein the step of moving the probe to contact the pin comprises the step of moving the probe in a predetermined pattern about possible locations of the pin based on the first probe position.

4. The method of claim 1, further comprising the steps of:
    storing the position of the probe when contact is made; and
    retrieving stored positions of the probe to determine the location of the pin.

5. The method of claim 1, further comprising the step of programming a processing system to control movement of the movable arm.

6. The method of claim 1, further comprising the step of controlling movement of the probe by operator manipulation of the movable arm.

7. The method of claim 1, further comprising the step of using the further probe position and combinations of two previous probe positions to determine the location of the pin when there is no solution using the previous probe positions.

8. A system for aligning a movable arm with a target, comprising:
    a probe having a spherical portion and mounted on the movable arm;
    at least three pins, each of the pins baying a spherical portion and mounted on the target;
    a controller controlling movement of the movable arm;
    a contact detector detecting at least three contacts between the spherical portion of the probe and each of the three pins; and
    a processor determining locations for the pins based on probe positions when the contacts are detected from an intersection of three spheres being centered at respective probe positions.

9. A method for aligning a movable arm with a target, comprising the steps of:
    bringing a probe on the movable arm in contact with a pin on the target, the probe contacting the pin at a first probe position;
    moving the probe to contact the pin at additional probe positions;
    determining a location of the pin based on the location being a solution of possible locations for the pin determined from the respective probe positions;

moving the probe to contact the pin at further probe positions when the solution is not obtained and returning to determining the location; and repeating the steps of bringing, moving and determining for additional pins on the target.

10. A method for aligning a movable arm with a target, comprising the steps of:

bringing a spherical portion of a probe on the movable arm in contact with a spherical portion of a pin on the target, the probe contacting the pin at a first probe position;

moving the probe to contact the spherical portion of the pin at least two additional probe positions;

determining a location of the pin based on the location being an intersection of at least three spheres, each of the spheres being centered at a respective one of the first and the at least two additional probe positions and having a radius equal to a radius of the spherical portion of the probe plus a radius of the spherical portion of the pin; and repeating the steps of bringing, moving and determining for at least two additional pins on the target.

11. The method of claim 10, wherein the step of bringing comprises:

positioning the probe at a predetermined position with respect to an anticipated location of the target;

moving the probe in a pattern in a plane parallel to the anticipated plane of the target, the pattern covering an area corresponding to an anticipated target area;

moving the probe closer to the anticipated plane of the target when no contact has been made during the step of moving the probe in the pattern; and repeating the step of moving the probe in the pattern and moving the probe closer until the contact is made.

12. The method of claim 10, wherein the step of moving the probe to contact the spherical portion of the pin comprises the step of moving the probe in a predetermined pattern about possible locations of the pin based on the first probe position.

13. The method of claim 10, further comprising the steps of:

storing the position of the probe when contact is made; and retrieving stored positions of the probe to determine the location of the pin.

14. The method of claim 10, further comprising the step of programming a processing system to control movement of the movable arm.

15. The method of claim 10, further comprising the step of controlling movement of the probe by operator manipulation of the movable arm.

16. A system tin aligning a movable arm with a target, comprising:

a probe having a spherical portion and mounted on the movable arm;

at least three pins, each of the pins having a spherical portion and mounted on the target, a controller controlling movement of the movable arm;.

a contact detector detecting at least three contacts between the spherical portion of the probe and each of the spherical portions of the three pins; and processor determining locations for the pins based on probe positions when the contacts are detected from an intersection of three spheres being centered at respective probe positions.

17. A method for aligning a movable arm with a target, comprising the steps of:

bringing a probe on the movable arm in contact with a pin an the target, the probe contacting at a first probe position;

moving the probe to contact the pin at additional probe positions;

determining a location of the pin based on the location being a solution of possible locations for the pin determined from the first and additional probe positions; and repeating the steps of bringing, moving and determining for additional pins on the target.

* * * * *